United States Patent Office 3,432,340
Patented Mar. 11, 1969

3,432,340
ARTICLES COATED WITH VINYLIDENE CHLORIDE CONTAINING TERPOLYMERS
Pierre Mathis, Schaerbeek, and Pierre Demol, Brussels, Belgium, assignors to Solvay et Cie, Brussels, Belgium
No Drawing. Filed May 17, 1965, Ser. No. 456,493
Claims priority, application France, July 1, 1964, 980,354
U.S. Cl. 117—132          7 Claims
Int. Cl. B44c 1/08; C08d 13/16; B44d 1/36

ABSTRACT OF THE DISCLOSURE

An article having the characteristics of impermeability to water vapor, gases and greases and only slight adherence at cold temperatures to like articles, such characteristics being associated with a novel coating upon a support, such coating comprising a terpolymer of vinylidene chloride, vinyl chloride and an alkyl itaconate.

---

The present invention relates to a method of rendering objects impermeable to water vapor, gases and greases and only slightly adherent in the cold to similarly coated objects. More particularly, it relates to a method of rendering objects impermeable to water vapor, gases, and greases and only slightly adherent to similarly coated objects by coating said objects with organic solvent solutions of copolymers of vinylidene chloride obtained by copolymerizing vinylidene chloride with vinyl chloride and an alkyl itaconate.

It is well known that durable impermeability to water vapor, gasses and greases can be conferred on objects such as films of regenerated cellulose, or plactic polyamides, polyolefins, polyesters, polystyrene, or polyvinyl chloride, or to such objects such as paper, cardboard, fabrics, etc., by coating such objects with solutions of copolymers of vinylidene chloride, and particularly copolymers of vinylidene chloride and vinyl chloride, in suitable organic solvents.

Such copolymers are also suitable for coating metals such as aluminum, to which they give good heat-sealability and corrosion resistance.

The objects which have been coated with such solutions of copolymers are, however, subject to certain serious disadvantages which limit their usefulness. One of the most serious disadvantages results from the fact that objects so coated are strongly adherent to each other in the cold, making it extremely difficult to separate the coated objects without damage. While this adhesiveness can be reduced by the addition of waxes, colloidal silica, bentonite, diatomaceous earth or similar materials to the coating solutions, it is however necessary to add such quantities thereof in order to obtain the desired results that the desirable properties of the coatings such as their impermeability are almost completely lost. The coatings so treated not only become inadequate in heat sealability and impermeability but the coatings also become opalescent or opaque instead of remaining transparent.

It has now been found that it is possible to suppress substantially the adherence in the cold state of coated objects without being prejudicial to the other properties when the base copolymer contains alkyl itaconate units. The present invention concerns a method for preparing, by coating with copolymers of vinylidene chloride, coated objects impermeable to water vapor, gases, greases and only slightly adherent to each other in the cold state, which comprises using for coating an organic solvent solution of a resin obtained by copolymerizing vinylidene chloride with vinyl chloride and an alkyl itaconate. The latter involves mono-esters as well as di-esters of itaconic acid. Among these, methyl, ethyl, isopropyl or tertiary-buyl mono- or di-esters are preferred.

Although amounts as small as 0.2% by weight of the itaconate in the copolymer used for the coating exercises a favorable antiadhesive effect in the cold on the coated object, it is desirable to use at least 1% by weight of the alkyl itaconate. Its use in amounts greater than 20% by weight, however, is not justified for this purpose. In general, it is preferred to use copolymers containing 1–12% by weight of the itaconate.

For the copolymers used to be sufficiently soluble in the usual solvents, it is desirable that their vinylidene chloride content should not be greater than 80% by weight, but for satisfactory impermeability it generally should not be less than 35% by weight.

The amount of vinyl chloride in the copolymer is preferably between 15 and 60% by weight.

It has been found that the presence of the alkyl itaconate in the copolymers both improves their solubility and reduces the tendency of the coated objects to adhere to the irons of sealing machines.

In addition to the monomers mentioned above the copolymers used in the present invention can also contain various other monomers in order to give the copolymers certain desired properties. For example, small quantities of acrylic or methacrylic nitriles increase the solubility of the copolymer in organic solvents. The alkyl or epoxy-alkyl esters of unsaturated acids such as acrylic acid and the alkenyl esters or epoxy-esters can, for example, be used as plasticizers and as internal stabilizers.

The copolymers prepared by polymerization in the presence of small quantities of one or more unsaturated acids or their anhydrides such as, for example, acrylic, methacrylic, itaconic or crotonic acid or maleic anhydride form coatings having good adherence to the objects coated therewith.

The copolymers used in the present invention can be prepared by any of the conventional methods of producing copolymers. Copolymerization in emulsion, in suspension or in solution form are particularly satisfactory.

The examples which follow are given for the purpose of illustrating the invention. Any modifications of the procedures shown which are obvious to one skilled in the art and which do not depart from the basic concept of the disclosed invention are intended to come within the scope of the appended claims.

Examples 1 and 2 are given for the purpose of comparison with copolymers which contain no alkyl itaconates.

(A) PREPARATION OF THE COPOLYMERS

Example 1

A copolymer was prepared containing 640 parts by weight of vinylidene chloride, 350 parts by weight of vinyl chloride, and 10 parts by weight of acrylic nitrile, the polymerization being effected in emulsion form in the presence of 30 parts by weight of maleic anhydride. The emulsion was formed with sodium dodecyl-benzene sulfonate used in the ratio of 10 parts dissolved in 2000 parts of water containing 0.011 part of iron nitrate. The catalyst used consisted of 10 parts by weight of hydrogen peroxide. The polymerization was effected at 50° C. for a period of 15 hours. The conversion amounted to 95%. The relative viscosity of the copolymer measured at 20° C. and at a concentration of 5 gm./l. in tetrahydrofurane was 1.22.

The copolymer was soluble at 35° C. in a mixture of equal parts of ethyl acetate and toluene at a concentration of 200 gm./kgm. of solution.

Example 2

A copolymer was prepared using 770 parts by weight of vinylidene chloride and 230 parts by weight of vinyl chloride, the vinylidene chloride being gradually added during the polymerization. The reaction conditions were the same as used in Example 1. The relative viscosity of the copolymer formed was 1.2 and the copolymer was found to be soluble at 35° C. in a mixture of equal parts of methyl ethyl ketone and toluene in the ratio of 150 gm. per kgm. of solution.

Example 3

Using the method described in Example 1, a copolymer was prepared using 640 parts by weight of vinylidene chloride, 300 parts by weight of vinyl chloride, 50 parts by weight of dimethyl itaconate and 10 parts by weight of acrylic nitrile. A conversion of approximately 95% was obtained of a copolymer having a relative viscosity of 1.21. The copolymer was soluble at room temperature in a mixture of equal parts of ethyl acetate and toluene in the amount of 200 gm. per kgm. of solution.

Example 4

A copolymer was prepared, following the method of Example 2, from 770 parts by weight of vinylidene chloride, 180 parts by weight of vinyl chloride and 50 parts by weight of dimethyl itaconate. The relative viscosity of the copolymer thus formed was 1.18 and it was found to be soluble at room temperature in the solvent mixture described in Example 2, in the same proportions as with the copolymer of that example.

Example 5

In this experiment, a copolymer was prepared by emulsion polymerization in the presence of 30 parts by weight of acrylic acid, using 620 parts by weight of vinylidene chloride, 280 parts by weight of vinyl chloride and 100 parts by weight of dimethyl itaconate. The emulsion used was prepared by dissolving 10 parts by weight of a sodium alkyl sulfonate in 2000 parts of water containing 0.011 part of iron nitrate. The polymerization was carried out at a temperature of 45° C., for 18 hours, using as the catalyst 10 parts of hydrogen peroxide. A conversion to copolymer of approximately 95% was obtained. The relative viscosity of the copolymer, measured as previously described, amounted to 1.23, and the solubility, determined as described in Example 3, was approximately the same as found in that example.

Example 6

In this experiment, a copolymer was prepared, as described in Example 1, using 640 parts by weight of vinylidene chloride, 320 parts by weight of vinyl chloride, 30 parts by weight of dimethyl itaconate and 10 parts by weight of acrylic nitrile. The polymerization conditions were the same as in Example 1.

Example 7

A copolymer was prepared from 600 parts by weight of vinylidene chloride, 340 parts by weight of vinyl chloride and 60 parts by weight of di-tertiarybutyl itaconate, in the presence of 30 parts by weight of methacrylic acid. The copolymerization was effected in an emulsion made from 10 parts by weight of sodium lauryl sulfate dissolved in 200 parts of water containing 0.011 part of iron nitrate. The catalyst consisted of 2 parts by weight of ammonium persulfate and 0.2 part by weight of sodium sulfite. After maintaining the reaction temperature for 22 hours at 50° C. a conversion to copolymer approximately 90% was obtained. The relative viscosity of the copolymer produced was 1.25.

Example 8

In this experiment, a copolymer was prepared from 600 parts by weight of vinylidene chloride, 350 parts by weight of vinyl chloride and 50 parts by weight of diethyl itaconate, the polymerization being effected in the presence of 30 parts by weight of itaconic acid. The conditions of the reaction were the same as described in Example 7.

Example 9

In this experiment, a copolymer was prepared using 620 parts by weight of vinylidene chloride, 310 parts by weight of vinyl chloride and 70 parts by weight of monoisopropyl itaconate, the polymerization being effected in the presence of 30 parts by weight of maleic anhydride and under the same reaction conditions described in Example 3.

Example 10

Following the method of Example 9, a copolymer was prepared using 410 parts by weight of vinylidene chloride, 550 parts by weight of vinyl chloride and 40 parts by weight of dimethyl itaconate.

(B) PREPARATION AND PROPERTIES OF COATED OBJECTS

The copolymers used in accordance with the present invention are readily soluble in organic solvents or mixtures thereof. Among such, tetrahydrofurane, ketones, esters and ethers, used either alone or in mixtures are especially suitable for use. These solvents are often mixed with diluents, such as, for example, toluene or other aromatic hydrocarbons.

The copolymer solutions are advantageously used for coating various objects such as, for example, films or sheets of regenerated cellulose, or of plastics such as polyamides, polyolefins, polyesters, polystyrene or polyvinyl chloride, as well as objects made from paper, cardboard or metal. The coated objects are impermeable, heat-sealable, and of especial importance, substantially nonadherent to themselves in the cold.

Such solutions are likewise useful as primary varnishes for coatings with other resins in the form of aqueous dispersions or as solutions.

Various types of coating operations can be carried out with the copolymers described in Examples 1–10 above. Some of the properties of the objects coated therewith, and especially their adherence to each other in the cold, are shown in the tables given below:

same dispersion will not attach itself properly if it is applied directly to the polypropylene film, even after

TABLE

| Coating Examples No | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|
| Copolymers of Example No | 1 | 1 | 2 | 2 | 3 | 4 | 5 | 6 | 6 | 6 | 6 | 7 | 8 | 9 | 10 |
| Nature of the support | Regenerated cellulose | | | | | | | | Anchored polypropylene | | Polyamide 11 | Regenerated cellulose | | | Aluminum |
| Solvent mixtures in percent: | | | | | | | | | | | | | | | |
| Ethyl acetate | | | 30 | 30 | | | 30 | | 50 | 50 | 50 | 50 | 50 | 50 | 100 |
| Butyl acetate | | | 20 | 20 | | | 20 | | | | | | | | |
| Methyl ethyl ketone | | | | | 50 | 50 | | 50 | | | | | | | |
| Toluene | 50 | 50 | 50 | 50 | 50 | 50 | 50 | 50 | 50 | 50 | 50 | 50 | 50 | 50 | |
| Additions in gm./kgm. of polymers: | | | | | | | | | | | | | | | |
| Hydrogenated castor oil | | | 30 | 50 | | | 30 | | | | | | | | |
| Nitrogenous derivative of fatty acids of high melting point | | | | | 10 | 25 | | 10 | | | | | | | |
| Carnauba wax | | | | | | | | | 10 | | | 10 | 10 | 10 | |
| Paraffin with a M.P. of 58° C | | | | | | | | | 10 | 10 | 5 | 10 | | | 10 |
| Colloidal silica | 1 | 10 | 1 | 1 | 1 | 1 | 1 | 1 | 1 | 1 | 1 | 1 | 1 | 1 | 1 |

| Coating Examples No | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|
| Copolymers of Example No | 1 | 1 | 2 | 2 | 3 | 4 | 5 | 6 | 6 | 6 | 6 | 7 | 8 | 9 | 10 |
| Nature of the support | Regenerated cellulose | | | | | | | | Anchored polypropylene | | Polyamide 11 | Regenerated cellulose | | | Aluminum |
| Weights of coating, gm./m.² | 3.5–4 | | | | | | | | 5–6 | | 2 | ¹5.5 | 3.5–4 | | ¹5 |
| Appearance | Transparent | Turbid and granular | Transparent | Opaque | Transparent | | | | | | | | | | |
| Properties of the coated support: | | | | | | | | | | | | | | | |
| Adherence in cold gm | 900 | 200 | 850 | 230 | 170 | 150 | 50 | 220 | 260 | 270 | 250 | 60 | 130 | 250 | 90 |
| Permeability to water vapor gm./m.² per day | 40 | 58 | 19 | 27 | 38 | 21 | | | | | 15 | | | | |
| Strength of welds, 90° C | 105 | 38 | 83 | 27 | 95 | 89 | 76 | 112 | 39 | | 88 | 78 | 83 | 119 | 120 |
| Gm./cm., 105° C | 135 | 62 | 111 | 49 | 128 | 110 | 109 | 130 | 52 | | 216 | 114 | 118 | 142 | 220 |
| Welds formed at 150° C | 117 | 55 | 96 | 33 | 116 | 94 | 102 | 127 | | | 300 | 96 | 108 | 124 | 324 |

¹ On one side.

The coating of the objects referred to in the tables was carried out as follows: 850 g. of a mixture of solvents containing the required additives were heated to 60° C. To this was then added 150 g. of the copolymer while vigorously agitating. After complete solution the temperature was reduced to 35° C. and maintained at this point for a period of one hour.

Immediately thereafter, the coating of the object was accomplished by immersion and the coated film or other object then dried in a tunnel heated by infrared heat. In Examples 21–25 the coating was applied to only one face of the film by the use of two roller coaters and the coated film then dried in the tunnel by the circulation of heated air.

In the case of cellulosic objects (Examples 11–18 and 22–24) the coated films were conditioned for 3 days at 43% relative humidity and at 23° C.

Examples 11–14 are given for comparison with coating experiments with copolymers which do not contain any itaconate (Examples 1 and 2).

Examples 11 and 13 show that for normal amounts of additives, the adherence of the coated objects in the cold reaches excessive values. By increasing the amount of additives (Examples 12 and 14) the adherence of the coated objects in the cold can be reduced, but this is detrimental to the other properties of the coated objects: appearance of the coated object, permeability and resistance of welds.

Examples 15 and 16 show by comparison that the presence of dimethyl itaconate in the original copolymer with normal amounts of additives imparts to the coated films a reduced adherence in the cold.

In Example 20 a polypropylene film was coated with a very thin layer of the copolymer of Example 6. The adherence of the coated film in the cold was sufficiently small to permit all of the usual manipulations. The coated film was then given a second coating by the application of an aqueous dispersion of another copolymer containing a high percentage of vinylidene chloride in order to make it exceptionally impermeable. This second coating adhered perfectly and the complex material thus produced formed strong welds. It should be emphasized that this same dispersion will not attach itself properly if it is applied directly to the polypropylene film, even after the latter has been given a preliminary anchoring treatment.

In all of the experiments shown in the tables, the adherence of the coated objects in the cold was measured in the following manner:

From the coated object were cut 15 strips 30 x 200 mm. which were then stacked into a pile. A 10 x 30 mm. area of this pile (oriented longitudinally) was then subjected to a pressure of 10 kgm./cm.² for a period of ten minutes. The alternate strips of this pile were then secured in fixed position while the remaining strips were torn away successively by forces applied tangentially at a speed of 30 cm./minute, and measured with a dynamometer. The results, expressed in grams, were averaged over 7 measurements. The coated objects were deemed satisfactory for industrial use if their adhesion in the cold was less than 300 gms.

To evaluate the heat sealability of the coated object, 24 welds were formed transversely of the coating. They were formed on strips 30 mm. wide.

The heat-sealing machine was equipped with two irons 20 mm. wide, heated to a predetermined temperature. These irons were applied to the samples for 2 seconds under a pressure of 1.4 kgm./cm.². The weld was then torn at an angle of 180 degrees while the tearing force was measured with a dynamometer.

The permeability of the coated objects was then measured according to the ASTM standard E 96–53T, procedure E for tropical conditions (90% relative humidity at 37.8° C.).

What is claimed is:
 1. An article comprising a support having a coating thereon, said coating comprising a terpolymer of
   (a) 35–80% by weight of vinylidene chloride;
   (b) 15–60% by weight of vinyl chloride; and
   (c) 0.2–20% by weight of an alkyl itaconate.
 2. The article defined in claim 1 wherein said alkyl itaconate comprises a $C_{1-4}$ alkly itaconate.
 3. The article defined in claim 1 wherein said alkyl itaconate is present in said terpolymer in an amount of 1–12% by weight.

4. The article defined in claim 1 wherein said support is a sheet, film or foil.

5. The article defined in claim 4 wherein said support is regenerated cellulose, polyolefin, polyamide, polyester, polystyrene, polyvinyl chloride, paper or metal.

6. The article defined in claim 1 wherein said support is a fabric.

7. The article defined in claim 1 wherein said support is cardboard.

References Cited

UNITED STATES PATENTS

| | | | |
|---|---|---|---|
| 2,459,125 | 1/1949 | Cheyney | 117—161 X |
| 2,563,079 | 8/1951 | Smith | 260—80.77 X |
| 2,583,325 | 1/1952 | D'Alelio | 260—80.77 X |
| 2,748,027 | 5/1956 | Meier | 117—138.8 X |
| 3,014,004 | 12/1961 | Meier | 117—138.8 X |
| 3,072,483 | 1/1963 | Trevoy | 117—161 X |
| 3,251,817 | 5/1966 | Hahn et al. | 117—138.8 X |
| 3,353,990 | 11/1967 | Vieth et al. | 117—138.8 |

WILLIAM D. MARTIN, *Primary Examiner.*

J. E. MILLER, JR., *Assistant Examiner.*

U.S. Cl. X.R.

117—138.8, 145, 155, 161; 260—78.5, 80.77, 80.81